United States Patent [19]

Emmerich et al.

[11] 4,178,623

[45] Dec. 11, 1979

[54] MEASURING SENSOR FOR CAPACITIVE MEASUREMENT OF LIQUIDS AT SELECTED LEVELS

[75] Inventors: Bernd W. Emmerich, Bruehl; Rudolf Ehret, St. Augustin; Gerhard Hoyer; Hans R. Trampert, both of Oftersheim, all of Fed. Rep. of Germany

[73] Assignee: Sybron Corporation, Rochester, N.Y.

[21] Appl. No.: 896,511

[22] Filed: Apr. 17, 1978

[30] Foreign Application Priority Data

Apr. 19, 1977 [DE] Fed. Rep. of Germany ....... 2717301

[51] Int. Cl.² .............................................. H01G 7/00
[52] U.S. Cl. ................................... 361/284; 73/304 C
[58] Field of Search ....................... 361/280, 284, 285; 73/304 C; 324/61 P

[56] References Cited

U.S. PATENT DOCUMENTS

| | | | |
|---|---|---|---|
| 2,998,559 | 8/1961 | Smith | 361/284 |
| 3,025,201 | 3/1962 | Ponemon | 361/284 X |
| 3,269,180 | 8/1966 | Schreiber | 261/285 X |
| 3,838,318 | 9/1974 | Schmidt | 361/280 |
| 3,879,644 | 4/1975 | Maltby | 361/280 X |
| 4,021,707 | 5/1977 | Ehret | 361/284 |

*Primary Examiner*—E. A. Goldberg
*Attorney, Agent, or Firm*—Theodore B. Roessel; J. Stephen Yeo

[57] ABSTRACT

The parts of a measuring sensor include an electrode mounted on a conductive body and insulated therefrom. Part of the electrical capacitance between the electrode and the body is determined by the dielectric constant and conductivity of the material in which the electrode and body are immersed. A screening band is provided along part of the length of the electrode so as to shield the electrode from the electrical effects of the material so that only selected levels of material will affect the capacitance.

The sensor is ideal for use in enamelled steel vessels.

4 Claims, 4 Drawing Figures

MEASURING SENSOR FOR CAPACITIVE MEASUREMENT OF LIQUIDS AT SELECTED LEVELS

BACKGROUND OF THE INVENTION

The invention concerns a measuring sensor for the capacitative measurement of liquids by means of electrically insulated electrodes and more particularly concerns measuring sensors suitable for use in enamelled steel vessels and the like.

An example of a known measuring sensor of this type is described in U.S. Pat. No. 4,021,707 wherein it is disclosed that a platinum tape may be embedded in the enamel layer of a dip tube along the length of the dip tube, so that the filling level may be measured with the aid of that part of the electric field lines, which cross through a liquid on their path from the electrode to the metallic material. A second electrode may be embedded in the enamel layer at the bottom of the dip tube, so that the capacity between the second electrode and the steel body of the dip tube may be used for compensating the capacitance between the first electrode and the steel body, which is a function of the dielectric constant and/or the conductivity of the respective vessel filling material.

Such measuring sensors have proven to work well under operating conditions, since, due to the possible compensation, a sufficiently accurate continuous measurement can be carried out even in those cases where subsequent dielectric constants or conductivities of liquid filling materials differ. An accurate measurement of the filling level or monitoring of a reaction is not possible, however, if the liquid in the vessel is not homogeneous, for instance if the dielectric constant in the lower part of the vessel differs considerably from the dielectric constant of the liquid in the upper part of the vessel. It is therefore the purpose of this invention to improve a measuring sensor of the above referenced type in such a manner that continuous measurement of the filling level in partial areas is possible in inhomogeneous liquids, particularly in the case of different dielectric constants, or that interface levels, interface measurements, and other controls of the homogeneity of liquids with respect to the dielectric constant value can be carried out.

SUMMARY OF THE INVENTION

An electrode is mounted on a conductive body and insulated therefrom. Part of the electrical capacitance between the electrode and the body is determined by the dielectric constant and conductivity of the material in which the electrode and body are immersed. A screening band is provided along part of the length of the electrode so as to shield the electrode from the electrical effects of the material so that only selected levels of material will affect the capacitance.

Two pairs of electrodes and screening may be provided on the same body or different bodies and the unscreened end ranges of the two electrodes may be arranged at different levels.

The one embodiment, the electrode and screening band may be arranged on the inner surface of a conductive body in the form of a pipe.

DETAILED DESCRIPTION OF THE INVENTION

Figure 1:
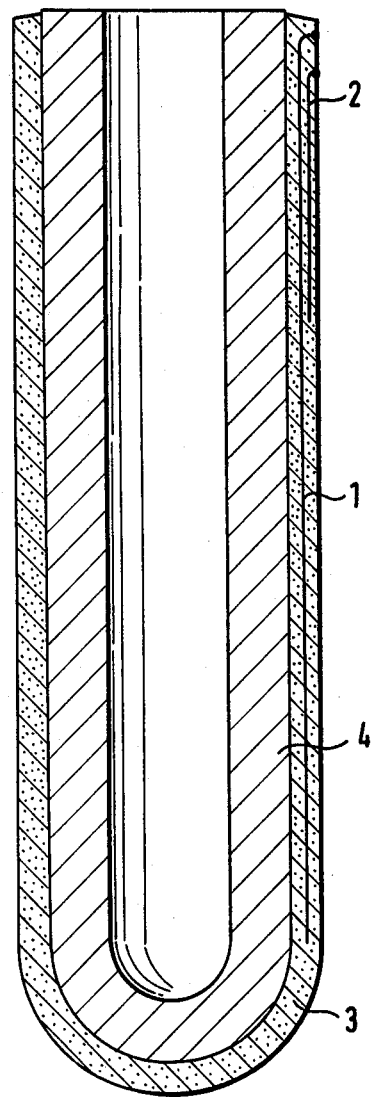
FIGS. 1–4 show longitudinal cuts through four examples of a measuring probe according to the invention.
Figure 2:
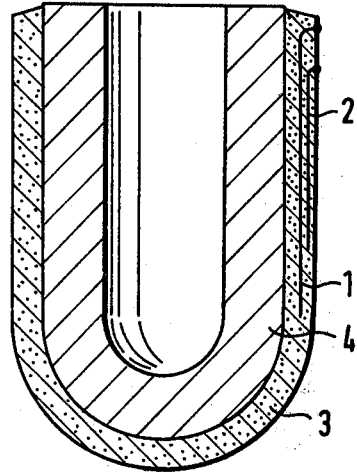
Figure 3:
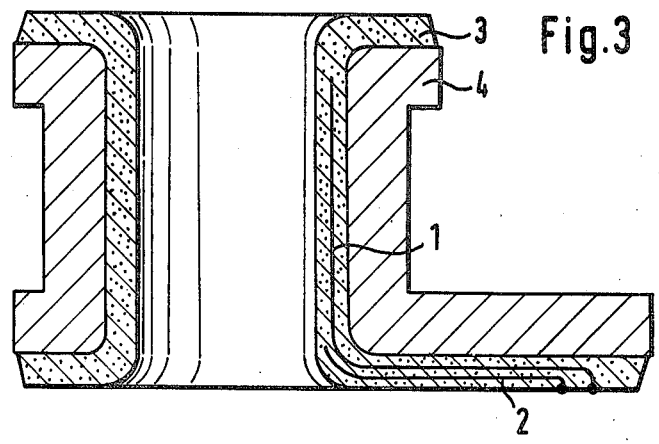
Figure 4:
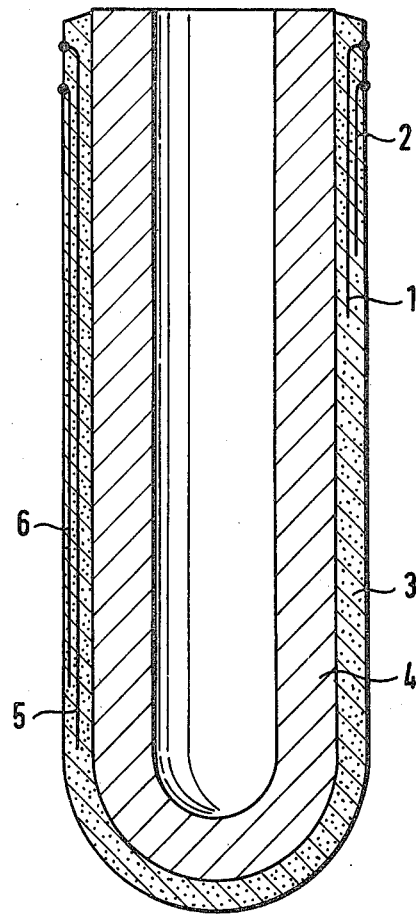

In the example shown in illustration 1 an electrode band 1 and a screening band 2 are embedded in an enamel layer 3 on a rod-shaped steel body 4.

The enamelled steel body may be a familiar installation element such as a thermowell or a dip tube. The metallic screening band 2 is embedded in the enamel layer between the electrode band 1 and the enamel surface in such a manner that the two bands are electrically insulated from each other and the steel body. The screening band 2 is wider than the electrode band 1 and screens the latter along part of the length. The electrode band and the screening band are preferably made of platinum.

This type of sensor is particularly advantageous in those cases where there is danger of product deposits below a mounting flange or a stuffing box of a vessel causing changes in capacity values overtime which would falsify the filling level measurement if suitable screening measures were not provided.

In the model shown in illustration 2 the screening band 2 covers the electrode band 1 except for a relatively short lower end range. This example is particularly well suited for measuring an interface level, such as when the filling level of a vessel is monitored by registering the difference in the dielectric constant between air and liquid filling.

The example shown in illustration 3 displays the steel body 4 as a steel pipe enamelled on the inside, at both ends of which there are enamelled flange surfaces are. The electrode band 1 runs along the flange surface and subsequently in an axial direction along the inside wall of the steel pipe. In the area of the flange surface the electrode band 1 is covered by the screen band 2.

This intermediate piece of pipe may, for instance, be installed between a drain connection of a vessel and a discharge valve. With the aid of a control circuit the discharge valve can then be operated in such a manner that it is closed after the vessel is emptied and a new batch of material can be fed into the vessel.

On the other hand, the heavier lower phase in a separator may be drained until the valve is automatically closed upon a signal given by the measuring equipment when the upper phase with a different dielectric constant enters the intermediate pipe. Such an intermediate piece of pipe containing a measuring sensor according to this invention may also be installed in a pipeline in order to be able to obtain a signal as a function of whether a liquid flows through the line, and if so, which liquid flows through the pipe.

In the model shown in illustration 4 the electrode band 1 and the screening band 2 are arranged at the upper end of a dip tube in such a manner that only a relatively short end range of the electrode band is not covered. A second electrode band 5 is installed in the same dip tube which is covered by a screening band 6 except for the lower range. The lower, uncovered part of the electrode band 5 is located much lower than the covered end range of the electrode band 1. Using this type of electrode arrangement the homogeneity of a material contained in a vessel thus can be measured in reference to the dielectric constant, by comparing the values measured by the two electrodes which are arranged in different areas of the product area, so that the difference of the two signals can be indicated directly as criteria for the evaluation. Thus the registration of the homogeneity or even an intended inhomogeneity is posible, when, in the one case a mixing process and, in the other case a phase separation is to be monitored. If the distance of the two unscreened electrode ranges should be variable, the screening electrodes may be installed in separate dip tubes or other built-in elements.

It has been seen that a specific advantage of the invention is that the unscreened area of the electrode band may be installed in a vessel so as to be in an optimum position for a particular measurement.

I claim:

1. An improved measuring sensor for capacitive measuring of liquid level in a vessel of the type having a first electrode band embedded in an enamel layer of a steel body serving as an opposite electrode, and where at least part of the capacitance between the first electrode band and the steel body is a function of the dielectric effects of a liquid in electrical proximity to the first electrode band, wherein the improvement comprises a metallic screening band (2) which is wider than the first electrode band and which is embedded in the enamel layer (3) between the first electrode band (1) and the enamel surface, said screening band covering only a portion of the first electrical band providing a screened range of the first electrode band shielded from the dielectric effects of liquid and an unscreened range so that only liquid levels corresponding to the unscreened range affect the capacitance of the sensor.

2. A measuring sensor according to claim 1 wherein the improvement further comprises a second electrode band (5) at a distance from the first electrode band (1), screened by a second screening band (6) along part of its length, the second electrode band being imbedded in the enamel layer of the same steel body, and that the unscreened end ranges of the two electrode bands are arranged at different levels of the vessel.

3. A measuring sensor according to claim 1 wherein the improvement further comprises a second electrode band (5) at a distance from the first electrode band (1), screened by a second screening band (6) along part of its length, the second electrode based being embedded in the enamel layer of a different steel body, and that the unscreened end ranges of the two electrode bands are arranged at different levels of the vessel.

4. A measuring sensor according to claim 1, wherein the improvement further comprises the steel body being in the form of a pipe having a enameled layer or the inside, wherein the electrode band (1) and the screening band (2) are embedded in the enamel layer.

* * * * *